United States Patent [19]
Kornylak

[11] 3,912,072
[45] Oct. 14, 1975

[54] RADIUS CHAIN CONVEYOR

[75] Inventor: Andrew T. Kornylak, Hamilton, Ohio

[73] Assignee: Kornylak Corporation, Hamilton, Ohio

[22] Filed: Feb. 25, 1974

[21] Appl. No.: 445,070

[52] U.S. Cl. .............................. 198/183; 104/172 B
[51] Int. Cl.² .................... B65G 17/00; B65G 19/00
[58] Field of Search ....... 74/245 R, 245 C; 198/183; 104/172 B, 172 C

[56] References Cited
UNITED STATES PATENTS

| | | | |
|---|---|---|---|
| 2,652,143 | 9/1953 | Van Doren | 74/245 R |
| 2,777,566 | 1/1957 | King | 198/183 |
| 3,590,745 | 7/1971 | Ouska | 104/172 B |
| 3,631,967 | 1/1972 | Converse | 198/183 |

*Primary Examiner*—Evon C. Blunk
*Assistant Examiner*—Douglas D. Watts
*Attorney, Agent, or Firm*—Thomas E. Beall, Jr.

[57] ABSTRACT

A power chain conveyor is provided with two parallel endless chains, which may extend in a straight or curved conveyor path with rollers mounted on the chain to respectively engage the load with their top surfaces and a track with their bottom surfaces to drive the load at twice the speed of the chain with rolling contact. Preferably a pair of such load and track engaging rollers are provided on a common axis with smaller rollers that may be selectively engaged with a separate rail to disengage the load supporting rollers from their tracks, which will idle the load supporting rollers because the lifting and load supporting rollers do not have any driving connection therebetween. This idling is desirable to stop articles on the moving conveyor without any substantial friction, to even spacing of articles, to assist in the lateral transfer of articles from the conveyor, and when applied only to the inside chain for a curved conveyor path, the article will be conveyed along the path without rotating with respect to the path, which rotation would otherwise occur since the outside chain would of necessity be longer than the inside chain for such curved path.

4 Claims, 5 Drawing Figures

RADIUS CHAIN CONVEYOR

BACKGROUND OF THE INVENTION

The patent to Blaisdell, U.S. Pat. No. 733,804, issued July 14, 1903, discloses an endless chain driven by spaced sprockets and having a plurality of rollers freely rotatably mounted thereon so as to support a load. The chain may pass over a stationary support that supportingly engages the under portion of the rollers, with rolling contact, so that the load supported on the other side of the rollers will be driven at twice the chain speed; also, a station is provided wherein the underside of the rollers may engage an independently driven belt that may selectively be driven at twice the speed of the chain and in the same direction as the chain, so that a load carried on the opposite side of the rollers from the belt will remain stationary.

SUMMARY OF THE INVENTION

It is an object of the present invention to provide a driven conveyor comprising a rollered chain for directly supporting the load on the rollers of the chain in a versatile and efficient manner.

The chain is preferably constructed and supported so that it may travel in an arcuate path, within a generally horizontal plane, to move a load around a corner; preferably two chains are provided to engage the load at transversely spaced points, and the chain on the inside of the arcuate path is selectively idled so that the orientation of the load with respect to the path of travel will remain unaltered despite the fact that the length of the arcuate paths for the two chains will be different due to the different radii. Further, roller means are provided to guide the chains in their arcuate path.

A load is idled as above mentioned on the arcuate path, or selectively along a straight path as desired, by selectively relatively moving the chain rollers and their supporting tracks out of engagement so that the rollers will idle as the chain moves, so that there will be no driving force transmitted to the load. Preferably, additional rollers are provided on the chain and an additional movable track to engage such additional rollers will provide for the relative shifting. The load may be thus idled for a number of reasons, including the transverse shifting of the load from the conveyor by other means, to assist in removing the load from the conveyor, to provide for accumulating loads at a particular station, or to prevent crowding of the loads, for example. Such a chain conveyor has minimum driving friction due to exclusive rolling contact and efficient bearings, and is ideally suited to convey heavy flat bottomed loads, such as pallets or containers, at high speeds or the like.

BRIEF DESCRIPTION OF THE DRAWING

Further objects, features and advantages of the present invention will become more clear from the following detailed description of a preferred embodiment of a conveyor apparatus according to the present invention, as shown in the accompanying drawing, wherein.

DETAILED DESCRIPTION OF THE INVENTION

Figure 1:
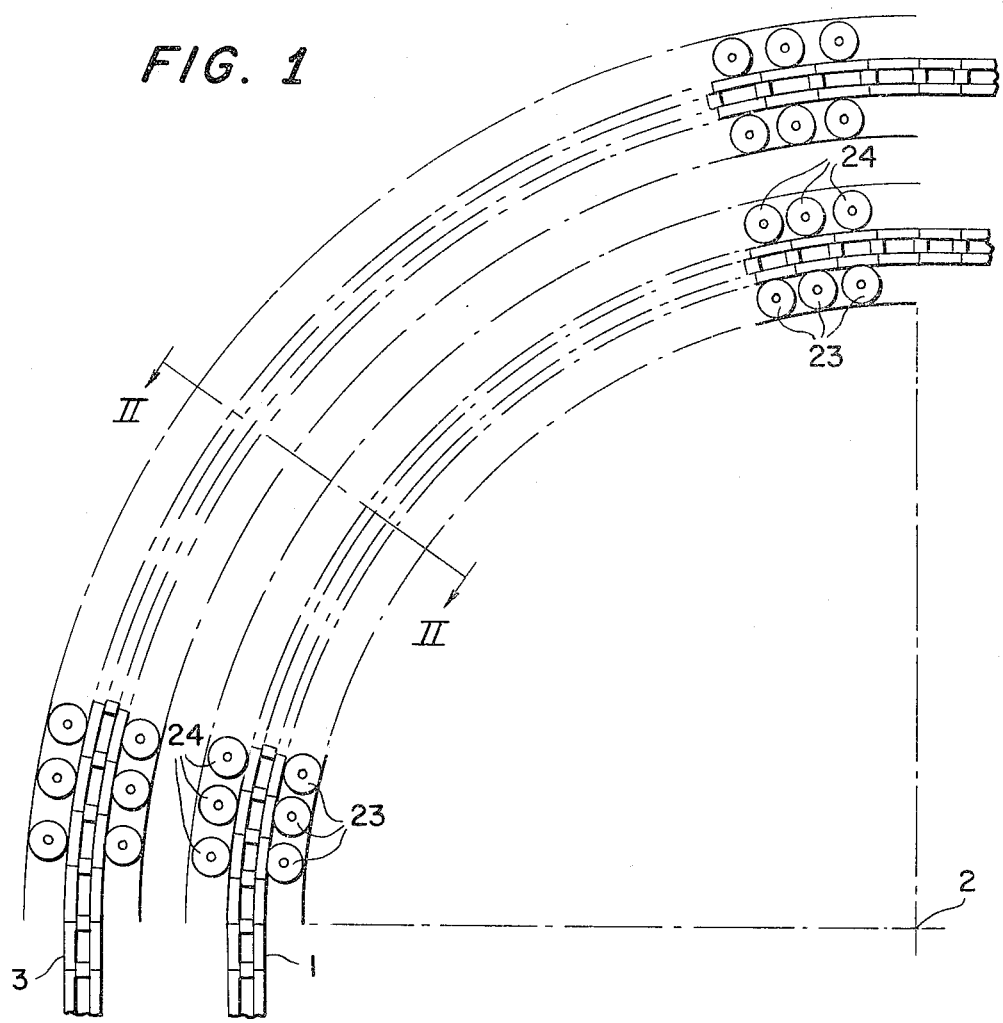
FIG. 1 is a plan view of a portion of the conveyor that travels in an arcuate path.

FIG. 1 is a plan view of a curved portion of the conveyor according to the preferred embodiment of the present invention, and comprises a first chain run traveling in a substantially horizontal plane in an arcuate path having a center at 2. The conveyor also includes a second chain 3 generally parallel with the chain 1 and having its illustrated horizontal run traveling in an arcuate path of a radius more than the arcuate path of the chain 1, but with a common center at 2. These chains are inherently flexible enough to travel in different curved paths than that illustrated, which may or may not be portions of a circle. The conveyor also includes a straight line run for the chains 1 and 3, as illustrated on an enlarged scale in FIG. 4, which is also a plan view. It is contemplated that a single chain may constitute the straight chain portion of FIG. 4 and the curved portion of FIG. 1, or this chain may be conveniently broken into several chains with sprockets as needed.

Figure 3:
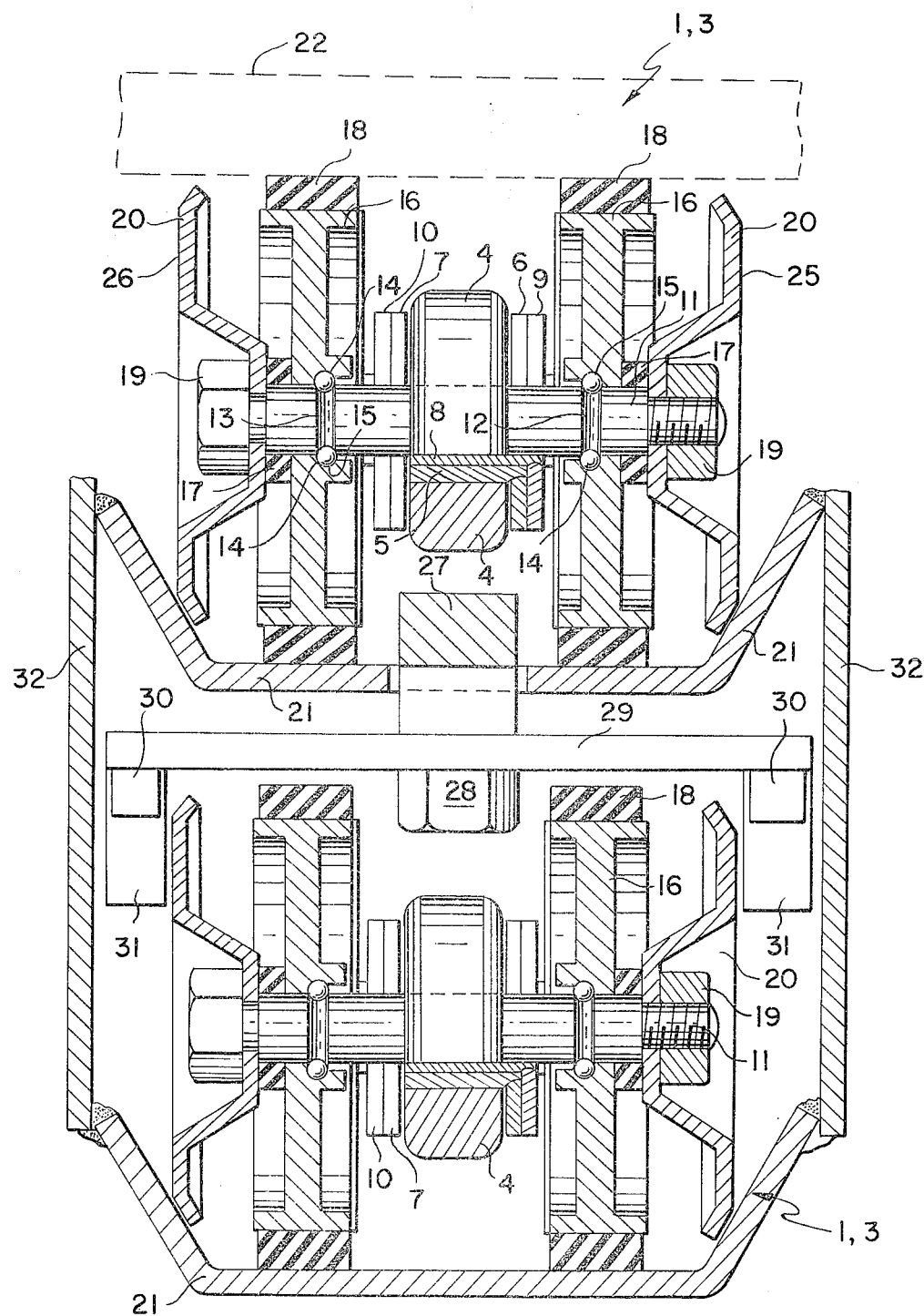
FIG. 3 is an enlarged cross sectional view of one side of the conveyor showing the conveyor support and one embodiment of the lifting mechanism.

Preferably, the basic chain structure is that of a commercially available chain, for purposes of economy, which basic chain structure comprises, as shown in detail in FIG. 3, a roller 4 freely rotatably mounted on an outer hollow shaft 5 that is rigidly secured to oppositely disposed inner links 6 and 7, and an inner hollow shaft 8 that is concentric with and freely rotatable with respect to the adjacent shaft 5 and rigidly carries at its opposite ends outer links 9 and 10. In the known manner of such a conventional chain, this structure will be repeated serially so that the inner links 6 and 7 of one roller 4 will extend in one direction to engage the outer hollow shaft of the next adjacent roller in that direction, while the outer links 9 and 10 will extend in the opposite direction to engage the inner hollow shaft of the next roller in that opposite direction. In such a manner, this commercially available chain may be formed in any length as an endless chain, which may be supported by a plurality of sprockets having teeth engaging the rollers 4. The chain linkage and bearing joints inherently have sufficient flexibility such that a straight line portion of the chain may be transversely bent, as shown in FIG. 1, so that it will have a radius of, for example, 9 feet.

As shown in FIG. 3, the present invention has modified the above described commercially obtained chain by providing a solid axle 11 extending through the hollow shafts 5 and 8, with either a friction or bearing fit between the hollow shaft 8 and solid shaft 11. On opposite sides of the shaft 11, there are provided grooves 12 and 13, respectively, forming annular inner races for ball bearings 14, which ball bearings further engage outer races 15 that are formed within the hubs of wheels 16. In this manner, the wheels 16 are mounted on the shaft 11 by antifriction bearings. The wheels 16 are held from moving inwardly by the configuration of their races and the balls 14, and are held from moving outwardly, with respect to the axis of the shaft 11, by means of axial thrust washers 17 respectively, which may be synthetic resin rings. The wheels 16 may be constructed of metal or molded synthetic resin, but preferably have annular rubber tires 18 on their outer periphery. The outer terminal ends of the shaft 11 are reduced in diameter and threaded to receive nuts 19, which will clamp configured sheet metal discs 20 rigidly onto the shaft 11. These discs 20 may be stamped and cut from sheet metal, and their function will be described hereinafter.

As seen in FIG. 3, the chain which may be chain 1 or chain 3 is rollingly supported on a track 21 that will engage the tires 18 with rolling contact. From FIG. 3, it is seen that if a load 22 were supported on the upper periphery of the tires 18, it would be driven at twice the speed of the driven chain due to the rolling contact between the wheels 16 and the track 21. The chain shown in FIG. 3 has an upper run traveling in one direction to an end sprocket wherein it will change directions to provide for a return run, in the lower portion of FIG. 3, which will be traveling in the opposite direction to another sprocket for changing directions to the upper run, the upper portion of FIG. 3, to present an endless chain, which is driven by providing rotational power to one or more of the supporting sprockets.

When the wheeled chain of FIG. 3 travels within the horizontal plane, arcuate path of FIG. 1, guide means are provided to maintain the wheeled chain in such arcuate path. Since the chains 1 and 3 are substantially identical and their guide means are substantially identical, except for their length, only the guide means of chain 3 will be described in detail. A plurality of rollers 23 that are preferably freely mounted for rotation on stationary vertical axes are arranged serially on the inside of the arcuate path, and a corresponding plurality of rollers 24 that are freely mounted for rotation on respective vertical axes are arranged in a corresponding outer arcuate array. The rollers 23 are positioned so that their periphery will engage the axial support surface 25 of the discs 20, which support surface generally extends vertically; correspondingly, the rollers 24 are so arranged that they will engage the axial support surfaces 26 of the discs 20, to maintain the chain in the arcuate path as it is driven. With tension on the driven chain, it may be found that only the inner array of rollers 23 are necessary to maintain the chain in the arcuate path, but with discs 20 on each side of the chain, the chain may be easily bent in either direction as desired for a particular conveyor layout.

Figure 2:
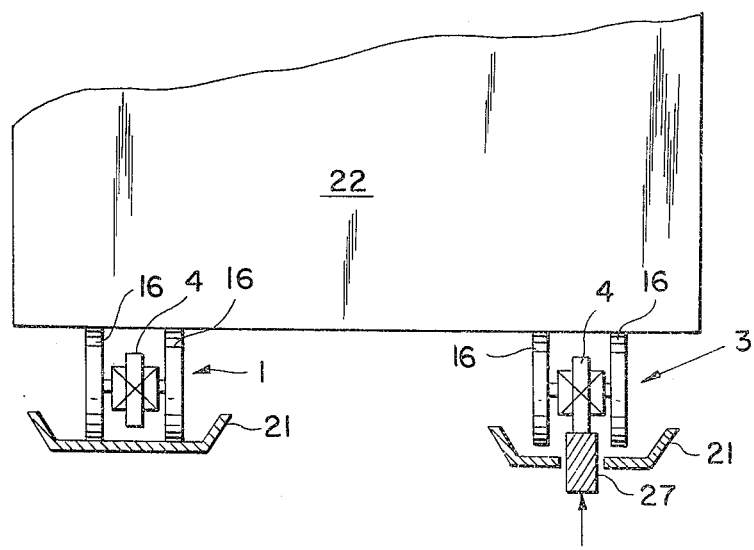
FIG. 2 is a somewhat schematic cross sectional view taken along line II—II of FIG. 1.

From FIG. 1, it is seen that the length of the chain 3 must be considerably longer than the length of the chain 1, since the radius of curvature for the arcuate portion of the chain 3 is substantially less than the radius of curvature for the arcuate path of the chain 1. Without compensation, such a difference in length would change the angular orientation of the load with respect to the overall conveyor path, which is undesirable. A further feature of the present invention is the idling of the load engaging wheels 16 over selected portions or all of the arcuate path for chain 3, while providing for powering of the wheels 16 over the entire arcuate path of chain 1, so that the angular orientation of the load with respect to the arcuate path of travel for the conveyor will not change. This is accomplished by the control means shown in FIG. 2. In FIG. 2, it is seen that the chain 1 has its wheels 16 in rolling engagement with the track 21 and with the load 22, so that the portion of the load engaging the wheels 16 will be traveling at twice the speed of the chain 1 due to this rolling contact. However, the wheels 16 of the conveyor chain 3 are not in engagement with their adjacent track 21, although they are in supporting engagement with the adjacent lower surface of the load 22. As schematically shown in FIG. 2, a rail 27 is shown as being in engagement with the rollers 4 of the chain 3 to support the chain 3, which in turn supports the load 22, and further to maintain a spacing between the wheels 16 of the chain 3 and the track 21, so that there will be no rolling contact between the track 21 and the adjacent wheels, which wheels will therefore idle. It is to be noted that the rollers 4 are freely mounted for rotation with respect to their hollow shafts, and thus there is no driving connection between the rollers 4 and the wheels 16. Therefore, the rollers 4 will have rolling contact with the rail 27, which will produce little friction for the chain 3, but this will not provide any drive for the wheels 16 of the chain 3.

While the control means of FIG. 2 have been shown schematically, they are shown in more detail in FIG. 3. In FIG. 3, it is seen that the rail 27 is spaced from the rollers 4, so that as previously mentioned the wheels 16 are in rolling contact with the track 21 to correspondingly drive the load. By means of a suitable coupling, including nut 28, the rail 27 is connected to a cross member 29 that has cam surfaces 30 rigidly depending from its opposite ends. The rail 27, cross piece 29, and cam surfaces 30 are generally mounted on the stationary frame 32 for limited vertical movement. The control means further includes cam surfaces 31 that may be moved in unison relative to the cam surfaces 30 to lift the cam surfaces 30, cross member 29, and rail 27 upwardly, with respect to FIG. 3, so that the rail 27 will engage the rollers 4 and thereafter further lift the wheeled chain with respect to the support 32 so that the wheels 16 will become disengaged and spaced from the track 21, as shown in FIG. 2 with respect to chain 3. If desired, the cam surfaces 31 may be freely rotatable rollers and shifted horizontally with respect to the cam surfaces 30.

Figure 5:
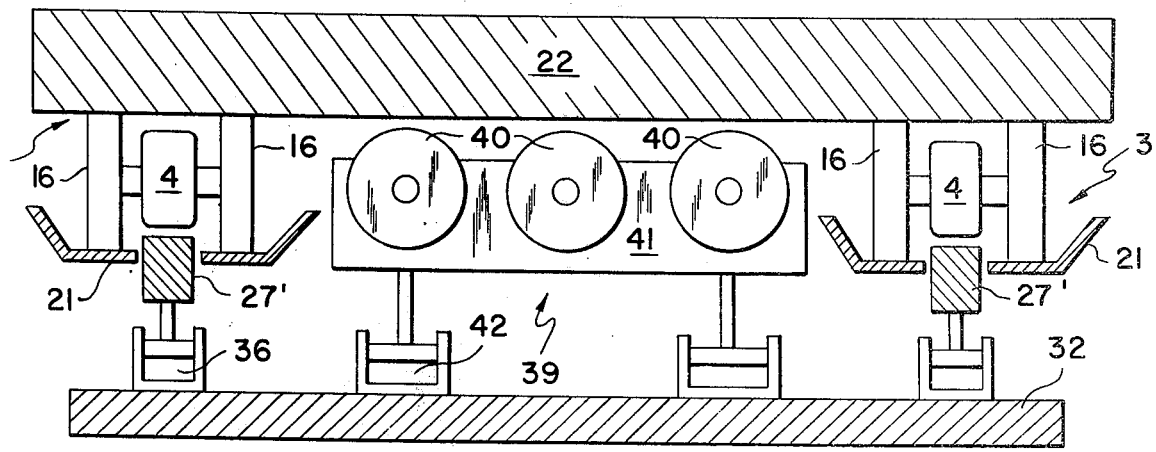
FIG. 5 is a somewhat schematic cross sectional view taken along V—V of FIG. 4.

When the conveyor is in operation around a curved portion as shown in FIG. 1, both of the wheeled chains 1 and 3 will be driven by their respective sprockets at substantially the same linear speed; the linear speed is preferably the same since these same chains must travel in parallel straight line portions as shown in FIG. 5, where it is necessary for the chains to travel at the same linear speed to prevent rotation of the load within the straight line runs of the chains. With the curved portion of the conveyor run as shown in FIG. 1, the inside wheeled chain 1 will be driven throughout its arcuate length by having its wheels 16 in continuous rolling contact with its associated track 21. However since the outside chain 3 is substantially longer over its arcuate travel than the inside chain, portions of this arcuate travel for the outside chain 3 will not be powered with respect to the load, to avoid rotation of the load with respect to the path of travel of the conveyor; this is accomplished by the control means previously described with respect to FIG. 3, where the wheels 16 of the wheeled chain 3 are lifted out of contact with their adjacent track 21 so that they will idle although the chain will continue to move. It is thus seen that the rail 27 will extend over a considerable portion beneath the curved run of the conveyor 3, and it may be desirable to have the rail 27 extend over the entire curved portion of the chain 3 according to the principles taught by the present invention.

Figure 4:
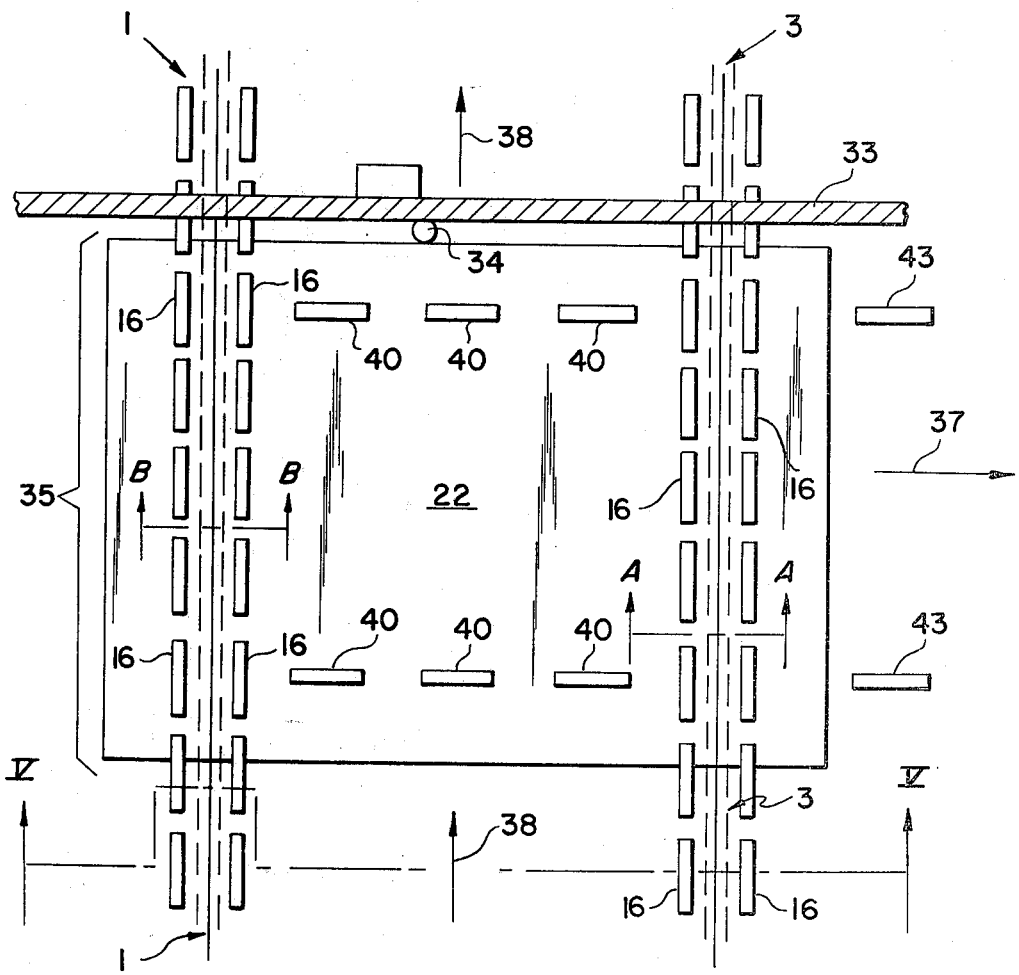
FIG. 4 is a plan view of a linear portion of the conveyor having a transfer station.

A straight run of the conveyor is shown in FIG. 4, on an enlarged scale with respect to FIG. 1. As shown in plan view, the wheeled chains 1 and 3 are parallel to each other and travel in straight horizontal paths. As mentioned previously, the chains 1 and 3 will be driven by their sprockets at the same speeds to prevent rotation of the load 22 that is carried thereon. For purposes of illustration, the chains 1 and 3 in FIGS. 4 and 5 have been shown schematically, although it is understood that these chains are the same as previously described. More particularly, cross sectional views taken on either line A—A or B—B of FIG. 4 would be identical to the cross sectional view shown in FIG. 3, and reference may be made to FIG. 3 for details pertinent to FIGS. 4 and 5.

In FIGS. 4 and 5, it is seen that the load 22 is supported at its opposite sides by the wheels 16 of wheeled chains 1 and 3, respectively. When it is desired to stop a load with respect to the conveyor, a wall 33 or abutment may be stationarily provided in the path of load 22 or selectively swung into the path of load 22. The abutment wall 33 carries thereon a limit switch or other type of object sensing device 34 that will indicate the presence of an object 22 in the position shown in full lines for the load 22. With actuation of the switch 34, suitable automatic controls (not shown) will idle the wheels 16 immediately below the load 22, so that the load 22 will be held stationary without any driving force thereon even though the wheeled chains 1 and 3 continue to move in their endless path. The wheels 16 immediately beneath the load 22 in FIG. 4 may be idled as previously set forth with respect to the cam mechanism of FIG. 3 and the rail 27, or they may be idled as shown by the variation of the control means in FIG. 5, but with either construction, it is desirable to idle only those rolls that are immediately beneath the load 22, by providing the rail 27 or 27' of appropriate length as designated by reference numeral 35 for both wheeled chains 1 and 3. The variation of the control means that is shown in FIG. 5, comprises a rail 27' that may be lifted by a fluid piston, cylinder device 36 into engagement with the rollers 4, to otherwise act in an identical manner as the control means of FIG. 3, and of course such control means are identical for both wheeled chains 1 and 3.

After the load has been stopped as above mentioned, by lifting the wheels 16 and 17 that engage the load from their respective tracks, the load 22 may be shifted transversely in the direction of arrow 37, with respect to the normal direction 38 of the conveyor by the transfer means 39. This transfer means includes a plurality of powered rollers 40 that are mounted on a vertically movable support 41, which support 41 is in turn mounted on the stationary support 32 by means of expansible chamber devices 42, so that with fluid being supplied to the expansible chamber devices 42, the movable support 41 will be lifted up to in turn engage the rollers 40 with the bottom surface of the load 22 and lift the load 22 out of engagement with the wheels 16. If the rollers 40 are powered, they may be actuated after the load 22 has been so lifted from the wheels 16 to move the load in the direction of arrow 37 onto an auxiliary conveyor schematically represented at 43. It is also contemplated that the rollers 40 may be mounted for free rotation and that a separate pusher mechanism (not shown) or the like may be used to push the load 22 transversely in the direction of arrow 37, or this pushing may be accomplished manually. Further, it is contemplated that the control means 33, 34 may be eliminated and replaced by a manually operated switch.

While in the above preferred embodiment, the idling of the load supporting wheels has been accomplished by lifting the wheeled chain from its supporting track, it is also contemplated that the supporting track may be moved downwardly away from the wheeled chain, so that the chain rollers 4 may drop supportingly onto a stationary rail 27, which rail 27 may be placed at selected portions along the conveyor run.

Since the operation of the conveyor has been described throughout the description, a separate summary of the operation will not be set forth.

While a preferred embodiment of the present invention has been set forth in detail for purposes of illustration of the invention, and further with respect to the desirable specific details, further embodiments, variations and modifications are contemplated according to the broader aspects of the present invention, all according to the spirit and scope of the following claims.

What is claimed is:

1. A power chain conveyor, comprising: at least two endless chains being mounted so as to be adapted to be driven in respective adjacent endless paths with generally adjacent conveyor runs, each of said endless chains having a plurality of links serially pivotally connected to each other and a plurality of rollers rotatably mounted on said links; track means below the conveyor run of each of said chains to engage and support the adjacent ones of said rollers with rolling contact as said chains are driven; said rollers having their axes of rotation generally horizontal along the conveyor runs; said rollers of each chain extending above the remainder of said chain along the conveyor runs to support a load placed directly on said rollers within the conveyor run opposite from said track means for driving the load at twice the speed of said chains, with rolling contact between said rollers, the load and said track means; the conveyor runs of said chains including an arcuate path in a generally horizontal plane, with one of said chains and its track means being on the outside curve of said arcuate path, and the other of said chains and its track means being on the inside curve of said arcuate path; control means to idle only the rollers of one of said chains while simultaneously maintaining driving contact of the rollers of the other chain track means so the load traveling along the arcuate path on said chains will maintain its orientation with respect to said conveyor runs despite the difference in length of the inside and outside curves of the arcuate path.

2. The conveyor of claim 1, wherein at least said one chain further includes a plurality of wheels of smaller diameter than said rollers and being mounted on said links for free rotation about respective axes parallel with the axes of said rollers so that they will not supportingly engage the load; said control means including said wheels and a second track means engaging said wheels along at least a portion of the arcuate path.

3. A power chain conveyor, comprising: at least two endless chains being mounted so as to be adapted to be driven in respective adjacent endless paths with generally adjacent conveyor runs, each of said endless chains having a plurality of links serially pivotally connected to each other and a plurality of rollers rotatably mounted on said links; track means below the conveyor run of each of said chains to engage and support the adjacent ones of said rollers with rolling contact as said chains are driven; said rollers having their axes of rotation generally horizontal along the conveyor runs; said rollers of each chain extending above the remainder of said chain along the conveyor runs to support a load placed directly on said rollers within the conveyor run opposite from said track means for driving the load at twice the speed of said chains, with rolling contact between said rollers, the load and said track means; control means for selectively moving said track means and said rollers of all of said chains relatively out of engagement within only a portion of said conveyor run to correspondingly idle a load at said conveyor run portion while said chain is being driven; transfer means at said conveyor run portion having a plurality of transfer rollers mounted for rotation about respective axes extending in a generally horizontal plane and at a substantial angle with respect to the axes of said chain rollers; said transfer means being mounted for selective vertical movement to bring the top load support plane of said transfer rollers from below to above the top load support plane of said chain rollers to correspondingly selectively lift a load from said chains, while the load is being held stationary with said chain rollers idling out of engagement with said track means by said control means.

4. The conveyor of claim 3, wherein said chains further include a plurality of wheels of smaller diameter than said rollers and being mounted on said links for free rotation about respective axes parallel with the axes of said rollers so that they will not supportingly engage the load; said control means including said wheels and a second track means engaging said wheels selectively at said conveyor run portion.

* * * * *